United States Patent Office 2,847,481
Patented Aug. 12, 1958

2,847,481

PRODUCTION OF OCTACHLOROMETHYLENE-CYCLOPENTENE

Aylmer H. Maude and David S. Rosenberg, Niagara Falls, N. Y., assignors to Hooker Electrochemical Company, Niagara Falls, N. Y., a corporation of New York No Drawing. Application August 9, 1954
Serial No. 448,736

5 Claims. (Cl. 260—648)

This invention is concerned with the production of unsaturated cyclic chlorocarbons having the empirical formula $C_6Cl_8$ and more particularly to the production of octachloromethylenecyclopentene. The process of the present invention involves introducing a mixture of a $C_6$ chlorohydrocarbon containing at least three chlorine atoms and chlorine into a reaction zone containing a porous surface active catalyst maintained at an elevated temperature to produce the $C_6Cl_8$ chlorocarbon in the desired yield.

One isomer of $C_6Cl_8$ was first produced by H. J. Prins (J. Prakt. Chem. (2) 89, 421 (1914)). This isomer melting at 183 degrees centigrade has the following theoretical structural formula:

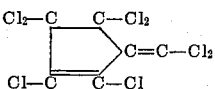

and is designated as octachloromethylenecyclopentene. Prins prepared it from hexachloropropylene using copper-bronze in methanol solution (see also Rec. Trav. Chem. 51, 1065 (1932) and 72, 253–261 (1953)). A Roedig (Experimentia 4, 305–307 (1948)) prepared the compound from hexachloropropylene using aluminum shavings in ethereal solution. Further (Ann. 569, 161–183 (1950)), Roedig again prepared the compound by dechlorinating either octachloropropane or hexachloropropene with aluminum powder. Prins also prepared the compound from these same two starting materials and in addition from heptachloropentene-1 (Rec. Trav. Chem. 65, 435 (1946)). Prins later made the isomer of $C_6Cl_8$ of melting point 183 degrees centigrade by two different methods (a) action of copper powder upon hexachloropropene in alcoholic solution, and (b) reaction of chloroform and trichloroethylene in the presence of aluminum chloride (Rec. Trav. Chem. 68, 419–425 (1949)).

The prior art refers to isolation of three of the four possible structural isomers of $C_6Cl_8$ having melting points of 45, 94, and 183 degrees centigrade. These structural isomers of empirical formula $C_6Cl_8$ may have any of the following theoretical configurations:

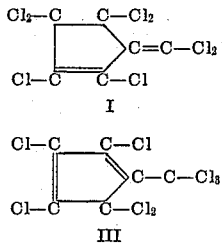 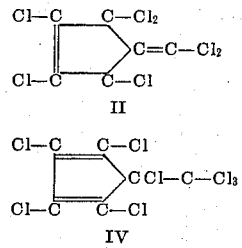

I  II

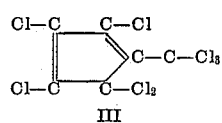 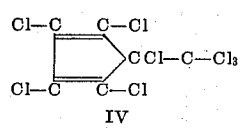

III  IV

These isomers are believed to be interconvertible. Although the present invention relates primarily to the production of octachloromethylenecyclopentene which is believed to have the structural formula corresponding to configuration I above, the process of the present invention produces a mixture of these isomers from which the desired $C_6Cl_8$ isomer may be separately recovered in substantially pure form. Apparently, the preparation of octachloromethylenecyclopentene has been of only academic interest as no attempt has been made to obtain the material by an economic process suitable for commercial manufacture.

Octachloromethylenecyclopentene is a valuable chemical intermediate, useful in the synthesis of various other chemicals having diverse uses in the commercial arts. For example, it may be used as the starting material for making perchlorofulvene by reacting it with aluminum shavings in the presence of freshly sublimed aluminum chloride in ether solution for a period of about 12 hours (see Roedig, Ann. 569, 161–183, (1950)). Also, various ketones may be made from octachloromethylenecyclopentene by reaction with sulfuric acid.

It is the object of this invention to provide a method for the production of octachloromethylenecyclopentene by an economic process which has a direct and simple procedure and which is readily adaptable to commercial operation. It is a further object to provide a method for the production of octachloromethylenecyclopentene from inexpensive starting materials. Other objects will become apparent to those skilled in the art on consideration of our complete specifications and claims.

We have now found that these and related objects are accomplished by reacting chlorine with a $C_6$ chlorohydrocarbon having at least three chlorine atoms in the presence of a porous surface active catalyst at temperatures between about 250 and 460 degrees centigrade.

The starting $C_6$ chlorohydrocarbon must have at least three chlorine atoms; however, the exact ratio of hydrogen to chlorine atoms is not critical. Any $C_6$ chlorohydrocarbon containing more than three, and preferably about eight to nine chlorine atoms may be employed in practicing our invention. Various $C_6$ hydrocarbons may be used as starting materials for preparing the chlorohydrocarbon; for example, n-hexane, iso-hexane, methylcyclopentane, as well as the corresponding olefins and diolefins, and mixtures thereof.

When carrying out the reaction, the proportion of free chlorine to employ is slightly (about 10 percent) more than the theoretical amount required to make octachloromethylenecyclopentene from the chosen starting materials. While a slight excess of chlorine (about 10 percent) is desired, a higher percentage will not prove detrimental to the reaction, but the amount of chlorine will be governed by economics of the process. The following equations are illustrative of this point.

$$C_6Cl_3H_{11} + 8Cl_2 \rightarrow C_6Cl_8 + 11HCl$$
$$C_6Cl_{10}H_4 + Cl_2 \rightarrow C_6Cl_8 + 4HCl$$

Materials selected from the group consisting of silica gel, bauxite, active carbon, kieselguhr brick, fuller's earth, floridin, attapulgite, diatomaceous earth and mixtures thereof are suitable porous surface active solids for use in this invention. These solids all have extensive active surface areas and are substantially unaffected chemically during their life in the reaction zone. They tend to become ineffective in use, probably due to reduction in porosity, and must be periodically replaced by fresh material. In general, the low cost of such solids renders it uneconomic to regenerate them when spent, but this can be done if desired.

The porous inorganic solid employed in the reaction zone can be pretreated by various techniques, such as, extrusion under pressure, acid extraction, impregnation with various salts, etc., whereby enhanced results are obtained in this invention.

The porous solids may be impregnated with the chloride salts of various metals to enhance their activity; for example, iron, cobalt, or nickel, which are metals of group VIII of the periodic table.

The reaction temperature should be maintained between 250 and 460 degrees centigrade to obtain a high yield of octachloromethylenecyclopentene. The preferred range of temperature wherein we have obtained the best results is between about 275 and 350 degrees centigrade. The most desirable temperature for any particular starting material is that low enough for a minimum yield of hexachlorobenzene and high enough to reduce to a minimum hydrogen-containing organic products. The porous solid in the fore portion of the reaction zone is advantageously graded with lower activity material where the reactant vapors first contact it to avoid an excessively rapid exothermic reaction with a resulting temperature above the range indicated whereby chlorinolysis would result. The temperature should be maintained fairly uniform and in order to accomplish this condition it may be necessary to heat or cool the various reaction zones depending upon catalyst activity and the exothermic or endothermic character of the reaction taking place in that zone. For example, if chlorine content of $C_6$ chlorohydrocarbon feed were high, it may be necessary to heat the entire reaction zone; if low, cooling may be required in the initial zone and heat in the final zone.

The undesirable effects of localized overheating in the fore portion of the reaction zone containing the porous solid, whereby chlorinolysis is effected, may be minimized by diluting the gaseous reactants with an inert diluent. Hydrogen chloride concomitantly produced with the $C_6$ chlorohydrocarbons may be conveniently and advantageously used as an effective diluent for this purpose; however, other diluents such as nitrogen or carbon dioxide can be used.

The reactants are introduced into the reaction zone in the vapor state at substantially atmospheric pressure and come into contact with the porous solid. The contact time in the reaction zone is between about three and about fifteen seconds. This period must be long enough to accomplish chlorination, cyclization and double bond formation, but not so prolonged as to initiate the formation of undesirable decomposition products. The overall result is the production of octachloromethylenecyclopentene in good yield from inexpensive raw materials by carrying out the reaction in a specified temperature range in the presence of a porous surface-active catalyst.

While we have described our process as being conducted in a single reaction zone containing catalyst graduated according to activity, it may be carried out in more than one reaction zone in such a manner that each successive reaction zone contains catalyst of increasing activity. The bed of porous solids may be maintained in either the "fluidized" or fixed state.

By continuously transferring the entire effluent of the photochemical chlorinator into the fore part of the reaction zone of this invention we have found that about twelve moles of chlorine per mole of commercial hexane are necessary in order to realize the good yields of desired octachloromethylenecyclopentene of this invention.

In the examples which follow, the photochlorination of the hydrocarbon was effected in the presence of an inert gaseous diluent at a temperature which rose from minus 20 degrees centigrade at the start to a final temperature of about 80 degrees centigrade whereby liquid polychlorohexane was produced.

The apparatus for the thermal catalytic chlorination consisted of a nickel tube holding the porous inorganic catalyst. The tube was immersed in a molten-salt bath at a controlled temperature. The reaction zone involved a fore portion or first reaction zone containing a porous surface active solid of low activity. Each successive reaction zone contained catalyst of increasing activity.

The feed system consisted of a metered flow of chlorine and a controlled feed of polychlorohexanes made as above from such preferred stock as n-hexane, iso-hexane, various mixed hexanes, or methylcyclopentane. The exit from the catalyst tube was connected to a condenser consisting of a section of 2-inch nickel pipe holding a glass cooling thimble with water cooling.

A nominal retention time of about three to fifteen seconds was used. The time was calculated as indicated in the examples.

The organic product from the reactor was distilled in a column (20 mm. bore and 4 feet high) packed with protruded nickel packing. Fractionation was carried out at an absolute pressure of about 10 mm. of mercury. Essentially pure octachloromethylenecyclopentene was obtained by crystallization from suitable solvents.

The following examples illustrate our invention but are not to be construed as limiting the same to these examples.

*Example I*

About 1160 grams of n-hexane were photochemically chlorinated as above described to a specific gravity of about 1.6 which corresponds to a product having an average molecular formula of $C_6H_{5.4}Cl_{8.6}$.

A feed of 386 grams per hour (1.01 moles per hour) of such polychlorohexane and 348 grams per hour (4.9 moles per hour) of chlorine was fed to a reactor tube, holding 720 cubic centimeters of catalyst of fine granular particle size. The first quarter of the tube was charged with a mixture of 1 part pressure activated floridin and 6 parts pumice. The pumice used was inert in this reaction and serves to reduce the activity per unit catalyst volume. The second quarter of the tube was charged with 1 part pressure activated floridin and 3 parts pumice. The third and fourth quarters were packed with pressure activated floridin alone. The retention time was about seven seconds, calculated on a reaction temperature of 300 degrees centigrade, on the molal feed rates and the free space in the catalytic bed. The reaction temperature was between 300 and 320 degrees centigrade. The total organic product recovered amounted to 0.85 gram per gram of polychlorohexane.

A representative portion (338.0 grams) of the organic product was transferred to a vacuum fractionation apparatus and the components more volatile than $C_6Cl_8$ were removed. The residue was dissolved in carbon tetrachloride. Part of the carbon tetrachloride was evaporated to obtain a crystalline product and the crystals removed by filtration. These crystalline solids were dissolved in warm benzene and essentially pure octachloromethylenecyclopentene was obtained by crystallization from benzene at 20 degrees centigrade. The yield of the desired product was 41.3 percent by weight of the polychlorohexane fed.

In a manner after the foregoing example, using polychlorohexanes similarly produced, the following results were obtained under the conditions stated in the subsequent examples.

*Example II*

The polychlorohexanes were thermally chlorinated as in Example I. The polychlorohexane feed rate was 386 grams per hour (1.01 moles per hour) and the chlorine feed rate was 387 grams per hour (5.45 moles per hour). The reaction temperature was between about 350 and 430 degrees centigrade. The retention time was calculated as 6.0 seconds. There was thus obtained for each 100 grams of polychlorohexanes, 26.3 grams of $C_6Cl_8$, 26.0 grams of a compound having an empirical formula of $C_6HCl_7$ and smaller amounts of other chlorinated hydrocarbons.

*Example III*

The polychlorohexanes resulting from the photochemical chlorination of a mixed hexane feed were thermally chlorinated as in Example I. The feed rates were 169 grams per hour (0.45 mole per hour) of polychlorohexane and 222 grams per hour (3.13 moles per hour) of chlorine. The reaction temperature was between about 350 and 458 degrees centigrade. The retention time was calculated as 10.6 seconds. There was thus obtained for each 100 grams of polychlorohexanes, 17.8 grams of $C_6Cl_8$, 12.4 grams of hexachlorobenzene, 11.5 grams of a compound having an empirical formula of $C_6HCl_7$ and smaller amounts of other hydrocarbons.

*Example IV*

The polychlorohexanes resulting from the photochemical chlorination of 3 methyl pentane were thermally chlorinated as in Example I to produce a material having an average composition of $C_6H_7Cl_7$. The reaction temperature was 353 degrees centigrade. The retention time was calculated as 4.0 seconds. There was thus obtained for each 100 grams of polychlorohexanes, 21.7 grams of a mixture of isomers of $C_6Cl_8$ containing octachloromethylenecyclopentene in predominant proportion, 29.0 grams of hexachlorobenzene, 16.1 grams of hexachlorocyclopentadiene, 19.5 grams of a material having the empirical formula $C_6HCl_7$, and 22.6 grams of a mixture of material having the empirical formula of $C_5Cl_8$ and the isomers of $C_6Cl_8$.

*Example V*

The polychlorohexanes resulting from the photochemical chlorination of commercial hexane consisting of a mixture of the isomers were thermally chlorinated as in Example I. The flow rates were 169 grams per hour (0.45 mole per hour) of polychlorohexane and 222 grams per hour (3.13 moles per hour) of chlorine. The reaction temperature was between about 350 and 460 degrees centigrade. The retention time was calculated as 10.6 seconds. There was thus obtained for each 100 grams of polychlorohexane, 17.8 grams of $C_6Cl_8$, 12.4 grams of hexachlorobenzene, 11.5 grams of a material having the empirical formula of $C_6HCl_7$, and 9.8 grams of hexachlorocyclopentadiene.

*Example VI*

The polychlorohexanes resulting from the photochemical chlorination of commercial hexane consisting of a mixture of the isomers were thermally chlorinated as in Example I. The flow rates were 367 grams per hour (0.978 mole per hour) of polychlorohexane and 389 grams per hour (5.48 moles per hour) of chlorine. The reaction temperature was between about 450 and 495 degrees centigrade. The retention time was calculated as 5.25 seconds. There was thus obtained for each 100 grams of polychlorohexane, 50.9 grams of hexachlorobenzene, 11.2 grams of a compound having an empirical formula of $C_6Cl_8$ and smaller amounts of other chlorinated hydrocarbons.

In a manner after the foregoing examples, similar results may be obtained by substituting the catalyst employed therein for any one of the catalysts disclosed herein as being particularly effective for the reaction. For example, in place of the floridin catalyst employed any one or mixture of silica gel, bauxite, activated carbon, kieselguhr brick, fuller's earth, attapulgite, diatomaceous earth, may be substituted. When employing the more active catalyst for the reaction, which are embraced within the scope of this invention, such as activated carbon, it is desirable to dilute such catalyst with an inert diluent and to graduate the catalyst as depicted in the examples. Alternatively, in order to obtain the optimum yield of desired product, the reaction temperature may be decreased to favor the more active catalyst by any of a number of suitable means known in the art, such as by cooling or changing the rate of introducing the reactants to favor the reduced temperature condition desired. In place of the diluent, a combination of very weak catalyst mixed with a small amount of very active catalyst may be employed in order to obtain the optimum result, or a weak or exhausted catalyst may be used in the fore portion.

It will be understood that it is intended to cover all changes and modifications of the examples of the invention herein chosen for the purpose of illustration which do not constitute departures from the spirit and scope of the invention.

We claim:

1. The process which comprises reacting chlorine with a partially chlorinated hydrocarbon selected from the group consisting of partially chlorinated n-hexane, partially chlorinated iso-hexane, partially chlorinated methylcyclopentane, their corresponding olefins and diolefins, and mixtures thereof, said partially chlorinated hydrocarbon having at least 3 chlorine atoms per molecule, in the presence of a porous surface active catalyst at a temperature between about 250 and 460 degrees centigrade and recovering the organic product containing octachloromethylenecyclopentene.

2. The process of claim 1 wherein the porous surface active catalyst is selected from the group consisting of silica gel, bauxite, active carbon, kieselguhr brick, fuller's earth, floridin, attapulgite, diatomaceous earth, and mixtures thereof.

3. The process of claim 1 wherein the reaction is effected at a temperature between about 275 and 350 degrees centigrade.

4. The process of claim 1 wherein the porous surface active catalyst is floridin.

5. The process which comprises reacting chlorine with a partially chlorinated hexane having at least three chlorine atoms per molecule in the presence of a porous surface active catalyst comprising floridin at a temperature of about 300 degrees centigrade and recovering octachloromethylenecyclopentene therefrom.

References Cited in the file of this patent

UNITED STATES PATENTS 2,509,160    McBee et al. _____ May 23, 1950

FOREIGN PATENTS 503,063    Belgium _____ Nov. 4, 1951
708,328    Great Britain _____ May 5, 1954

OTHER REFERENCES

Roedig: "Annalen der Chemie," vol. 569, page 178 (1950).